No. 782,318. PATENTED FEB. 14, 1905.
S. G. BOARD.
VEHICLE TIRE.
APPLICATION FILED MAR. 14, 1904.

3 SHEETS—SHEET 1.

WITNESSES.
Joseph Bate
E. Howard

INVENTOR.
S. G. Board
by Howard O'Brien
atty.

No. 782,318. PATENTED FEB. 14, 1905.
S. G. BOARD.
VEHICLE TIRE.
APPLICATION FILED MAR. 14, 1904.

3 SHEETS—SHEET 3.

WITNESSES.
Joseph Bates.
E. Howard

INVENTOR.
S. G. Board
by J. Owens O'Brien
atty

No. 782,318. Patented February 14, 1905.

UNITED STATES PATENT OFFICE.

SAMUEL GEORGE BOARD, OF MANCHESTER, ENGLAND.

VEHICLE-TIRE.

SPECIFICATION forming part of Letters Patent No. 782,318, dated February 14, 1905.

Application filed March 14, 1904. Serial No. 198,141.

*To all whom it may concern:*

Be it known that I, SAMUEL GEORGE BOARD, a British subject, and a resident of Manchester, in the county of Lancaster, England, have invented certain new and useful Improvements in Tires for Motor-Cars and other Vehicles, of which the following is a specification.

This invention is designed to provide a tire for motor-cars and other vehicles with the object of minimizing the noise on paving or other stones and preventing skidding.

It consists, essentially, of the combination, with a perforated steel or metal tire, of a composition comprising wood-sawdust, magnesium oxid, and magnesium chlorid or hydrochloric acid compressed into the said tire and through the perforations therein.

The invention will be fully described with reference to the accompanying drawings, in which several examples of the invention are illustrated.

Figure 2:
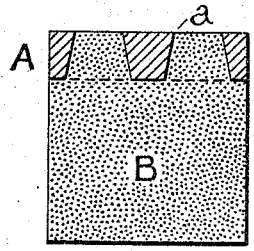
Figure 1:
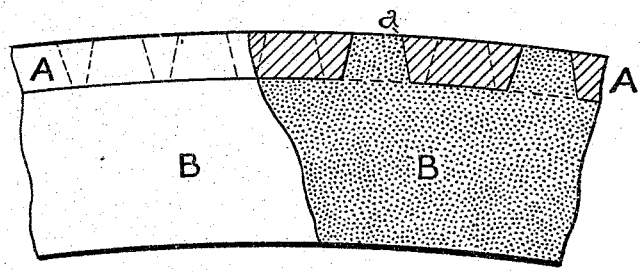
Figure 3:
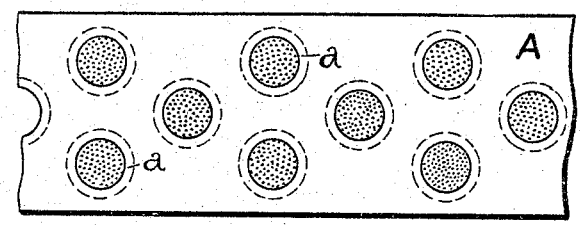
Figure 5:
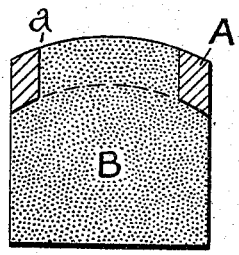
Figure 4:
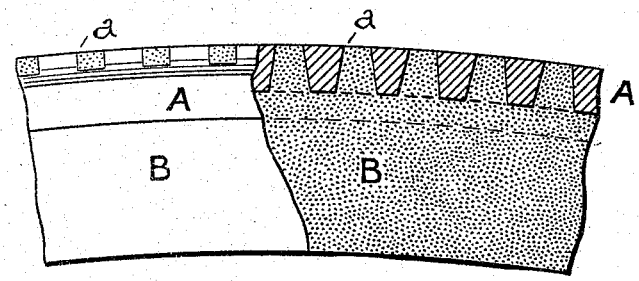
Figure 6:
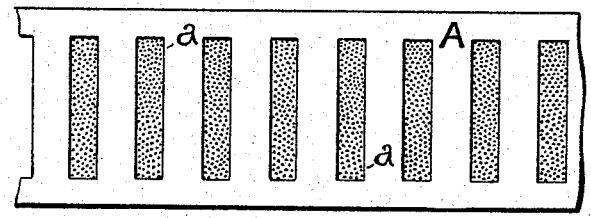
Figure 8:
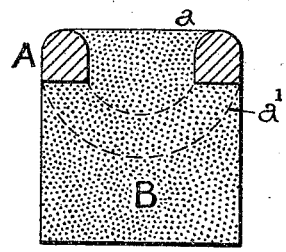
Figure 7:
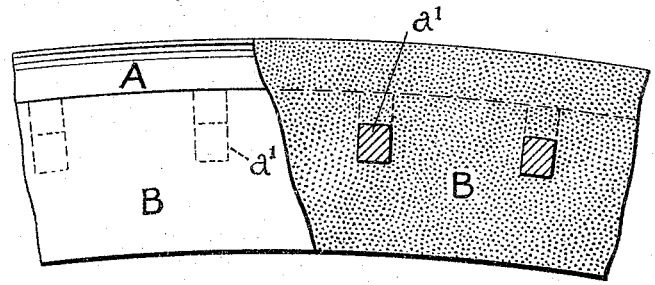
Figure 9:
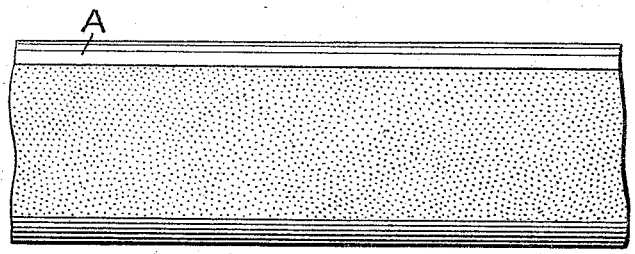
Figure 11:
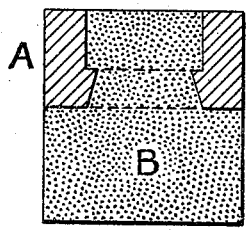
Figure 10:
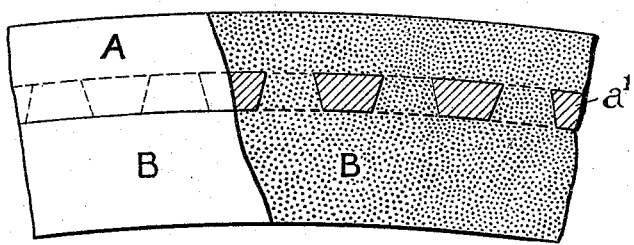
Figure 12:
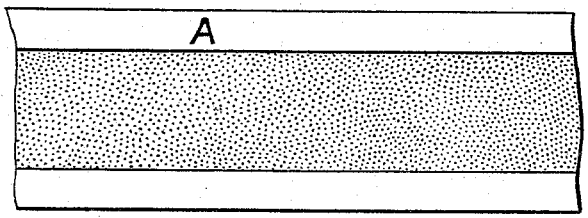
Figure 13:
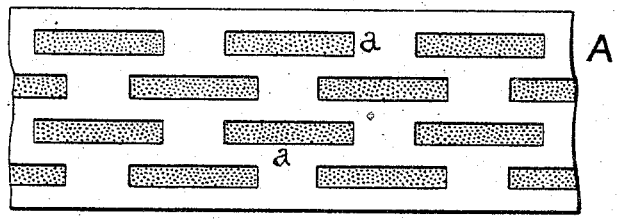
Figure 14:
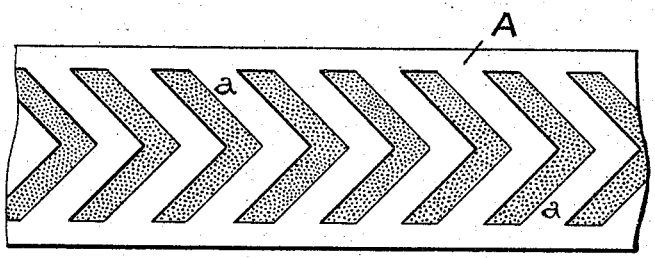
Figure 15:
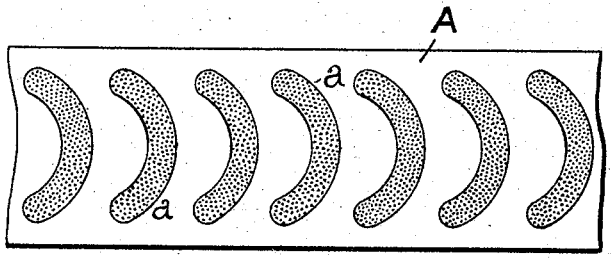

Figure 1 is a side elevation of part of tire or rim of wheel, partly in section; Fig. 2, a transverse section of same; Fig. 3, a plan; Fig. 4, a side elevation of modified construction, showing convex tire, partly in section; Fig. 5, a transverse section of same; Fig. 6, a plan; Fig. 7, a side elevation of another modification, showing concave tire, partly in section; Fig. 8, a transverse section of same; Fig. 9, a plan; Fig. 10, a side elevation of another modification, showing channel-section tire, partly in section; Fig. 11, a transverse section of same; Fig. 12, a plan; Figs. 13, 14, and 15, plans showing various shapes in which the perforations or holes in the tire may be made.

The tire A may be in the form of a plain hoop, (see Figs 1, 2, and 3,) or convex, (see Figs. 4, 5, and 6,) or concave, (see Figs. 7, 8, and 9,) or of channel section, (see Figs. 10, 11, and 12,) or of any other suitable cross-section. The surface of the tire is formed with a number of perforations, holes, slots, openings, or spaces $a$, by which about fifty per cent. (more or less) of the metal is removed.

Into the interior of the metal tire A and so as to force its way into and through the perforations therein is pressed a specially-prepared material, which when set presents a hard, compact, and durable wearing-surface and forms a rim B for the wheel, around which the metal tire A extends. The material which is employed for the purpose is composed of wood or cork sawdust or wood or other pulp or fiber or similar vegetable material, magnesium oxid, and farina, with a solution of magnesium chlorid or hydrochloric acid or other binding material, intimately mixed together. The material may be prepared from these substances in about the following proportions: wood-sawdust, thirty per cent.; magnesium oxid, twenty-five per cent.; farina, ten per cent.; magnesium chlorid, thirty-five per cent. The materials may, however, be mixed in any other suitable proportions, and the farina may, if desired, be dispensed with; but I prefer to use it, as it renders the material more elastic. Hydrochloric acid of commercial strength may be used with or instead of the magnesium chlorid. The material is kneaded in a plastic mass to the consistency of stiff dough. The material thus formed is while in a plastic state compressed into the tire A and into and through the perforations $a$ therein, presenting an elastic wearing-surface for the wheel.

The concave and channel tires (see Figs. 8 and 11) are preferably made with connecting bars or ribs $a'$ between the outer members to form the apertures $a$; but, if desired, such cross-bars may be dispensed with, the channel being itself only filled with the said material.

The openings or spaces $a$ in the tire to receive the material may be circular, as in Fig. 3, or may be formed of cross-bars, as in Figs. 9 and 12, or may be slots of any desired shape—such, for example, as shown in Figs. 13, 14, and 15.

What I claim as my invention, and desire to protect by Letters Patent, is—

1. Wheel-tires for motor-cars and other vehicles constructed of a metal hoop of any desired cross-section provided with perforations in combination with a plastic material of sawdust, magnesium oxid, and a binding material compressed therein until solidified substantially as described.

2. Wheel-tires for motor-cars and other vehicles constructed of a metal hoop of any desired cross-section provided with perforations in combination with a plastic material of sawdust magnesium oxid and magnesium chlorid compressed therein while soft until solidified substantially as described.

3. Wheel-tires for motor-cars and other vehicles constructed of a metal hoop of any desired cross-section provided with perforations in combination with a plastic material of sawdust and magnesium oxid and an elastic material and a binding material compressed therein while soft until solidified substantially as described.

4. Wheel-tires for motor-cars and other vehicles constructed of a metal hoop of any desired cross-section provided with perforations in combination with a plastic material of sawdust, magnesium oxid, farina and magnesium chlorid compressed into the said perforations until solidified substantially as described.

5. In a wheel-tire the combination of the metal tire A provided with perforations $a$ $a$ compressed material B forced into the perforations while soft and compressed therein until solidified consisting of sawdust magnesium oxid, farina and magnesium chlorid substantially as described.

In witness whereof I have hereunto signed my name, in the presence of two subscribing witnesses, this 4th day of March, 1904.

SAMUEL GEORGE BOARD.

Witnesses:
J. OWDEN O'BRIEN,
B. TATHAM WOODHEAD.